United States Patent
Arulf

[11] Patent Number: 5,890,680
[45] Date of Patent: Apr. 6, 1999

[54] DEVICE AT THE ADAPTER OF A LAUNCHER AND A SATELLITE CARRIED BY THE ADAPTER

[75] Inventor: Orjan Arulf, Linkoping, Sweden

[73] Assignee: Saab Aktiebolag, Linköping, Sweden

[21] Appl. No.: 796,688

[22] Filed: Mar. 4, 1997

[30] Foreign Application Priority Data

Mar. 7, 1996 [SE] Sweden .................................. 9600912

[51] Int. Cl.$^6$ ....................................................... B64G 1/64
[52] U.S. Cl. .......................................... 244/158 R; 124/17
[58] Field of Search .............................. 244/161, 158 R, 244/137.1; 124/17; 446/235, 261, 262

[56] References Cited

U.S. PATENT DOCUMENTS 2,891,351  6/1959  Madaras et al. .
3,392,482  7/1968  Nathan .
4,355,775  10/1982  Ganssle .
4,506,852  3/1985  Adams et al. .

*Primary Examiner*—Charles T. Jordan
*Assistant Examiner*—Tien Dinh
*Attorney, Agent, or Firm*—Pollock, Vande Sande & Amernik

[57] ABSTRACT

A device for imparting rotational movement to a satellite during discharge from an adapter of a launcher. The satellite includes a first axis, a second axis, and a third axis passing through a center of gravity. The first axis, the second axis, and the third axis are mutually perpendicular. The device includes at least one line dismountably attached to a first point on the satellite and a first point on the adapter. The at least one line is attached to the satellite and the adapter such that the at least one line imparts a rotational movement to the satellite as the satellite is discharged and separates from the adapter with a discharge velocity in a direction along the first axis. A lock dismountably attaches the at least one line to the satellite.

10 Claims, 1 Drawing Sheet

DEVICE AT THE ADAPTER OF A LAUNCHER AND A SATELLITE CARRIED BY THE ADAPTER

FIELD OF THE INVENTION

The present device relates to a device at the adapter of a launcher and a satellite carried by the adapter for achieving a movement of the satellite after separation from the adapter around a second axis through the center of gravity of the satellite, the second axis forming an angle to the velocity vector of the satellite, that is to say a first axis.

BACKGROUND OF THE INVENTION

When launching satellites with a launcher, which is provided at its top with an adapter. The adapter is arranged to dismountably hold the satellite until the moment. When the satellite is separated, it is usual to give the satellite a rotational movement around a velocity vector. That is to say, the satellite is caused rotate around a first axis, the spinning axis. In certain cases it is desired to give the satellite a rotational movement around a second axis, that forms an angle, especially a right angle, to the spinning axis. This can be achieved by providing the adapter with separation springs, directed in corresponding ways, or by designing the separation springs accordingly differently. As need for rotational velocity around the second axis increases larger and, thus, heavier separation springs are required. There is thus a demand for a simple and safe device to impart movements to satellites as described above. The object of the present invention is to create such a device.

SUMMARY OF THE INVENTION

A device according to the present invention device is characterized in that at least one line means is dismountably locked at a first point at the satellite and is fixed at a second point at the satellite. The first and second points are located in relationship to each other such that the line means, at separation of the satellite from the adapter, exerts a twisting moment at the satellite.

The dismountable locking of the line means at the satellite can be designed in different ways. For example, the locking could be exclusively mechanically, or by an electromagnet. Preferably, the line means is somewhat elastic. This elasticity must be adapted to the tensile force required to dismount the line means from the satellite. Providing two line means is often suitable.

BRIEF DESCRIPTION OF THE DRAWINGS

The invention is disclosed in the following, reference being made to the attached figures, of which:

In FIG. 1, the upper part of a launcher is marked by 1, and an adapter provided thereat by 2. A satellite 3 has a center of gravity 4, through which a first axis 5 shows the velocity vector, that is to say the spinning axis. A vertical axis 6 and a horizontal axis 7 run through the center of gravity, in this case at a right angle to the first axis 5. Two line means 8 and 9 are dismountably locked, at their ends, at locking means 10,11 at the satellite, symmetrically arranged in relationship to the first axis 5. In FIG. 2, it is seen, that the locking means are exclusively mechanical with a locking spring 15, holding an element 16, attached to the end of the line means 8. The line means are, at their other ends, fixed to points 12,13 at the adapter. At separation of the satellite from the adapter by separation springs, not shown, a relative velocity is created between the satellite and the launcher, whereat the line means are stretched until the locking means 10,11 dismount the line means. At this moment, the satellite is given a rotational movement around the vertical axis 6, as is indicated by the arrow 14.

Figure 1:
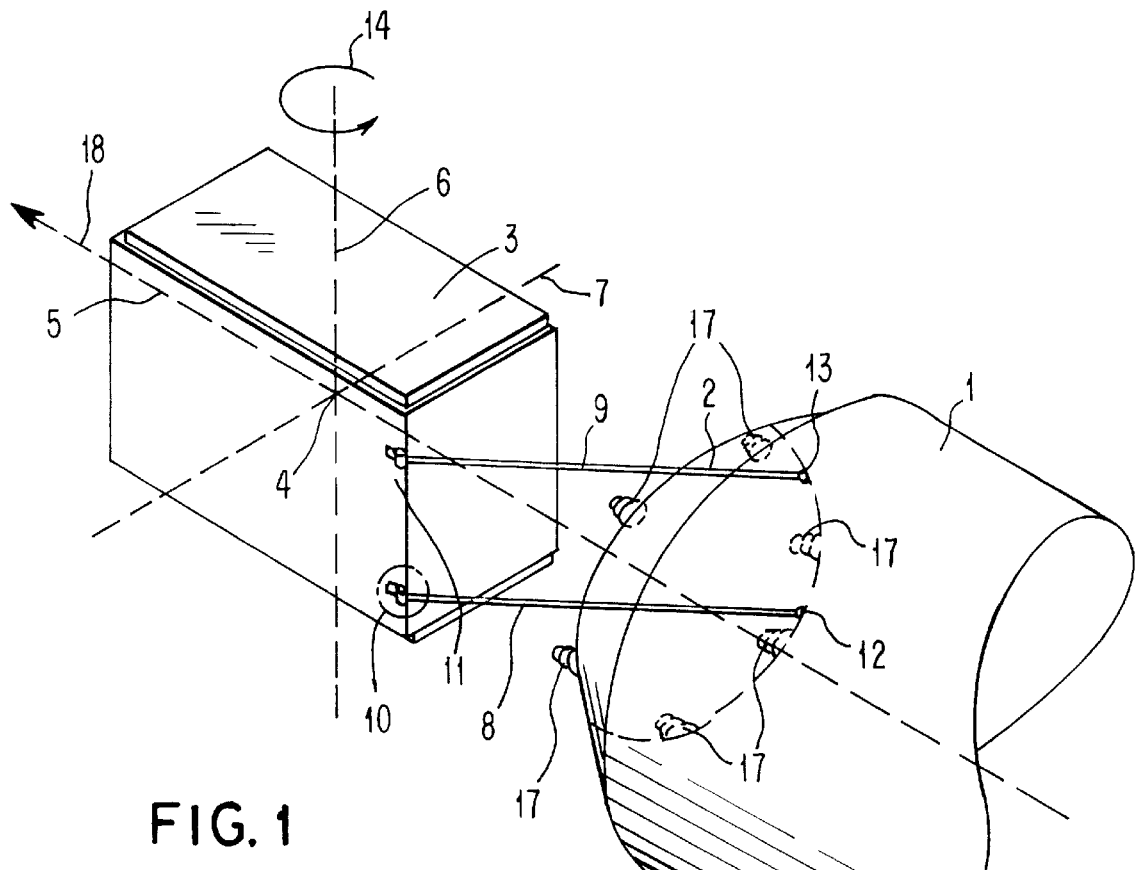
FIG. 1 shows, in perspective, a device according to the present invention, at the upper portion of a launcher with an adapter and a satellite.
Figure 2:
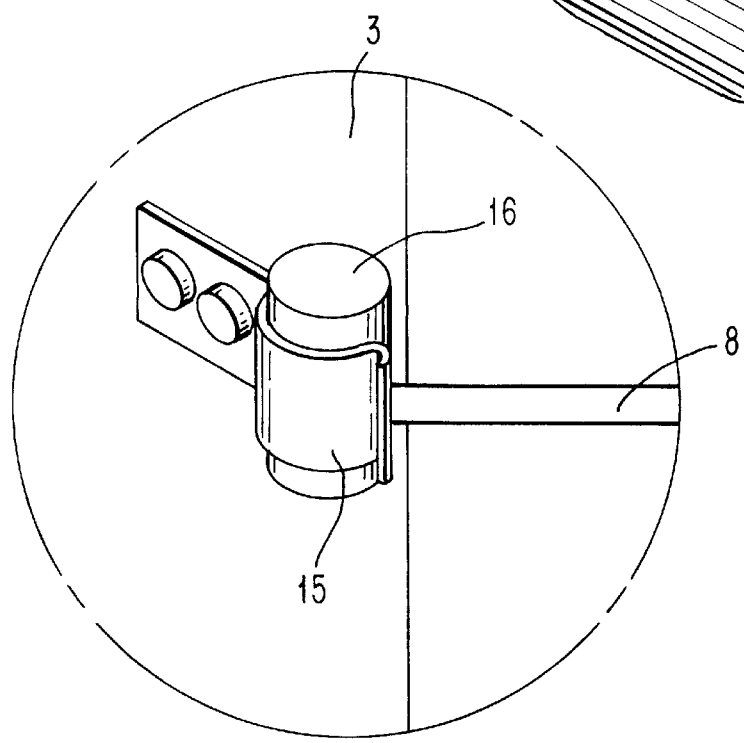
FIG. 2 shows a locking means as part of the device according to the present invention.

I claim:

1. A device for imparting rotational movement to a satellite during discharge from an adapter of a launcher, the satellite including a first axis, a second axis, and a third axis passing through a center of gravity, the first axis, the second axis, and the third axis being mutually perpendicular, comprising:

at least one line dismountably attached to a first point on the satellite and a first point on the adapter, the at least one line being attached to the satellite and the adapter such that the at least one line imparts a rotational movement to the satellite as the satellite is discharged and separates from the adapter with a discharge velocity in a direction along the first axis; and locking means for dismountably attaching the at least one line to the satellite.

2. The device according to claim 1, wherein the rotational movement is imparted to the satellite such that the satellite rotates about the second axis.

3. The device according to claim 1, wherein the rotational movement is imparted to the satellite such that the satellite rotates about the third axis.

4. The device according to claim 1, wherein the rotational movement is imparted to the satellite such that the satellite rotates about an axis passing through the center of gravity.

5. The device according to claim 1, wherein the locking means includes a locking spring attached to the satellite for dismountably attaching the at least one line to the satellite.

6. The device according to claim 1, wherein the device includes two lines dismountably attached to the satellite and the adapter, wherein the lines are symmetrically attached to separate points on the satellite and the adapter.

7. A method for imparting rotational movement to a satellite during discharge from an adapter of a launcher, the satellite including a first axis, a second axis, and a third axis passing through a center of gravity, the first axis, the second axis, and the third axis being mutually perpendicular, the method comprising the step of:

applying force to the satellite through at least one line dismountably attached to a first point on the satellite and a first point on the adapter, the at least one line being attached to the satellite and the adapter such that the at least one line imparts a rotational movement to the satellite as the satellite is discharged and separates from the adapter with a discharge velocity in a direction along the first axis.

8. The method according to claim 7, wherein the rotational movement is imparted to the satellite such that the satellite rotates about the second axis.

9. The method according to claim 7, wherein the rotational movement is imparted to the satellite such that the satellite rotates about the third axis.

10. The method according to claim 7, wherein the rotational movement is imparted to the satellite such that the satellite rotates about an axis passing through the center of gravity.

* * * * *